United States Patent [19]

Tazawa et al.

[11] Patent Number: 4,889,743

[45] Date of Patent: Dec. 26, 1989

[54] METHOD FOR CONTINUOUS TARTAR SEPARATION

[75] Inventors: Toshiaki Tazawa, Osaka; Masahiro Yotsumoto, Kanagawa; Hiroshi Tanahashi, Osaka; Yuzuru Wakabayashi, Hyogo, all of Japan

[73] Assignees: Suntory Limited, Osaka; Kansai Chemical engineering Co., Ltd., Amagasaki, both of Japan

[21] Appl. No.: 298,919

[22] Filed: Jan. 19, 1989

Related U.S. Application Data

[62] Division of Ser. No. 186,306, Apr. 26, 1988, Pat. No. 4,819,552.

[30] Foreign Application Priority Data

Apr. 28, 1987 [JP] Japan .................................. 62-105998

[51] Int. Cl.⁴ ............................................... A23L 2/30
[52] U.S. Cl. ..................................... 426/495; 99/277.2; 426/330.4; 426/330.5
[58] Field of Search ............... 426/330.3, 330.4, 330.5, 426/11, 15, 495; 99/277.2; 210/319, 259, 714, 738

[56] References Cited

U.S. PATENT DOCUMENTS

| | | |
|---|---|---|
| 3,869,389 | 3/1975 | Rokitansky .......................... 210/123 |
| 4,112,128 | 9/1978 | Fessler ................................ 426/330.4 |
| 4,322,446 | 3/1982 | Heess ................................. 426/330.4 |
| 4,351,851 | 9/1982 | Riese .................................. 426/495 |
| 4,560,565 | 12/1985 | Wucherpfennig ................ 426/330.4 |
| 4,798,131 | 1/1989 | Ohta .................................. 99/277.2 |
| 4,819,552 | 4/1989 | Tazawa .............................. 99/277.2 |

FOREIGN PATENT DOCUMENTS

| | | |
|---|---|---|
| 2392117 | 1/1979 | France ................................ 426/495 |
| 2450872 | 11/1980 | France ................................ 426/15 |
| 2493864 | 5/1982 | France ................................ 426/495 |
| 6269976 | 3/1987 | Japan . |

Primary Examiner—Carolyn Paden
Attorney, Agent, or Firm—Oblon, Spivak, McClelland, Maier & Neustadt

[57] ABSTRACT

A method for continuously separating tartar from wine or grape juice using a draft tube baffled (DTB) crystallizer 2 and a hydrocyclone 3. The DTB crystallizer 2 comprises a vessel 5, a draft tube 6 centered in the body 5, a stirrer and a cooling jacket 16, said stirrer producing a circulation of liquid along the draft tube. A liquid of wine or grape juice is continuously introduced from the bottom of the crystallizer 2 into the crystallizer 2 and entrained in the circulation together with seed crystals at a low temperature to crystallize tartar dissolved in the source liquid. Supernatant source liquid is overflown from the crystallizer 2 and separated by the hydrocyclone 3 into a chemically-stabilized product and a suspension in which a large amount of tartar crystals is contained. The suspension is continuously returned to the crystallizer 2 to keep seed crystals at a desired concentration in the crystallizer 2.

3 Claims, 3 Drawing Sheets

METHOD FOR CONTINUOUS TARTAR SEPARATION

This is a division, of application Ser. No. 07/186,306, filed Apr. 26, 1988, and now U.S. Pat. No. 4,819,552.

FIELD OF THE INVENTION

This invention relates to a method and an apparatus for continuously removing tartar from wine or grape juice in order to prevent tartar precipitation in their bottled products More particularly, it relates to a technique for reducing or eliminating tartar dissolved in a liquid by adding seed crystals to the liquid so as to cause secondary nucleation and promote crystal growth in the liquid, said seed crystals being tartar which has been separated from the liquid and consists primarily of potassium hydrogentartrate. The technique provides chemically stabilized juice and wine products and maintains their commercial value.

BACKGROUND OF THE INVENTION

Bottled wine often has tartar precipitates in the form of crystals on the bottom of the bottle. Such precipitates occur between bottling and consumption. These precipitates make the product unattractive to consumers.

Various methods have been proposed for preventing tartar precipitates. Tartar precipitates have been removed by cooling, cation exchange, anion exchange, reverse osmosis, and electrodialysis. Also, tartar precipitates have been inhibited by the use of additives.

Of the above methods, the cooling methods have been commonly used. The other methods have not been used commercially, since they suffer from various disadvantages.

A cooling method based on the primary nucleation of potassium hydrogentartrate which is a major component of tartar, is known. However, this method requires the maintenance of supersaturated solutions by means of cooling for a long time to produce natural nucleation. Thus, it cannot serve market demand immediately, and it requires a large initial investment for cooling equipment and storage equipment.

Another cooling method is known which comprises increasing tartar concentration by freezing and thickening wine to accelerate crystallization However, this method cannot steadily crystallize and remove tartar and requires additional freezing equipment. This still further increases initial equipment cost.

To eliminate the above disadvantages, some cooling methods have been proposed that comprise adding tartar seed crystals to a source liquid of wine so as to cause secondary nucleation and grow tartar crystals in the source liquid, and thereafter separating the tartar crystals These seeding methods are divided into two categories: A first contact method and a second carrier adhesion method The first method is disclosed, for example, in West German patent DE 3244221C1 issued to Westfalia Co. This publication discloses a process in which seed crystals of potassium hydrogentartrate and dipotassium DL-tartrate are also added to precipitate and remove calcium ions which inhibit the growth of tartar crystals. In Japanese Examined patent Publication No. 39157/1982, issued to Henkel and Co., a process is disclosed in which calcium carbonate is employed together with the seed crystal material The second method is disclosed, for example, in Japanese Examined patent Publication No. 5157/1981, issued to Henkel and Co. This publication discloses a process in which tartar is extracted from wine through the adhesion of the tartar on carriers made of fiber, etc. The carriers carry the tartar crystals to promote the extraction.

In the seeding methods, tartar dissolved in a source liquid is crystallized with seed crystals, and then the resulting suspension is separated into treated liquid and tartar crystals by use of mechanical separation means such as hydrocyclones, centrifuges and filters. The treated liquid is served as a product. A part of the tartar crystals is recycled and utilized as seed crystals In these methods, the suspension in which tartar which has been precipitated together with seed crystals in a reaction vessel, is introduced into separation means together with treated liquid, and then is separated. In other words, these methods are batch processes wherein whenever a treatment is conducted, a source liquid has to be introduced into the reaction vessel and seed crystals also have to be added to the source liquid. Therefore, these methods require a large amount of seed crystals and thus require separation means having a large capacity such as a centrifuge. Further, these methods based on the batch process are not advantageous to operation or equipment, i.e., they require a large-sized crystallizer or a number of crystallizers in order to treat a large amount of source liquid.

Usually, the suspension is stood for about two weeks so as to precipitate tartar crystals In order to shorten such period for the precipitation, Japanese Examined patent Publication No. 39157/1982 issued to Henkel and Co. suggests a continuous process wherein the suspension is stood for 1 to 2 days, and thereafter supernatant is discharged by use of auxiliary mechanical means. The process, however, additionally requires contact crystals to promote the precipitation of calcium tartrate resulting from the reaction of calcium carbonate and tartaric acid. It also requires a heating stage for promoting the reaction and requires the installation of intermediate plates and means for collecting gas generated in the crystallizing vessel. Therefore, it is apparent that the process requires complicated equipment and operation.

Japanese Examined patent Publication No. 5157/1981 issued to Henkel and Co. also suggests an apparatus which comprises a crystallizing vessel and a carrier which is as large as possible for installing it in the crystallizing vessel, pulverized seed crystals preliminarily adhering to said carrier, means for scraping crystallized tartar during the process, and a conveyor which discharges precipitated tartar. However, this system is also complicated and is not advantageous to operation, equipment or maintenance.

For the purpose of solving the above-described problems of the seeding methods and making it possible to efficiently and continuously conduct a seeding method without a batch process or large equipment, the present inventors suggested a draft tube baffled crystallizer (hereinafter referred to as DTB crystallizer) in Japanese Unexamined patent Publication No. 69976/1987.

As shown in FIG. 3 of the accompanied drawings, the DTB crystallizer 100 comprises a cylindrical vessel 101 which has an outlet 102 on its upper wall and an inlet 103 at its bottom, a draft tube 104 which is centered in a lower half portion of the vessel 101 and supported by supporting members 105, 105', a stirrer which comprises a shaft 106 extending along with the longitudinal axis of the vessel 101, propellers 107, 107' mounted on the shaft 106 inside the draft tube 104 and a propeller 108 mounted on the shaft 106 below the draft tube 104, and a cooling jacket 109 which is disposed on the exterior wall of the vessel 101.

The DTB crystallizer attains three functions of crystallization, classification and clarification in a vessel by forming the following two sections in the vessel in use. The first is a crystallization section wherein a source liquid is circulated along the draft tube at allow temperature so that tartar is crystallized involving seed crystals as nuclei. The second is a calm section which is located in the upper portion of the crystallizer and is not disturbed by the circulation of the crystallization section. The classification function is effected between the crystallization section and the calm section by allowing crystals to sink from the calm section to the crystallization section. The DTB crystallizer is simple in structure, low in cost and easy to maintain, and makes it possible to continuously separate tartar from a source liquid of wine or grape juice in a short time.

However, the rate of production has to be limited in order to form the two sections and maintain the functions of crystallization, classification and clarification in the DTB crystallizer. If the amount of a source liquid is increased in a continuous operation, the circulation along the draft tube extends to the calm section so that tartar contaminates the treated liquid and the treated liquid becomes chemically unstabilized.

The DTB crystallizer would be replaced with another large-scaled similar crystallizer rather than modified if the production capacity should be increased.

OBJECT OF THE INVENTION

It is an object of the present invention to provide a method and an apparatus for continuously separating tartar from a source liquid by adding seed crystals to the source liquid, which are free from any limited operation conditions and which ensure the effect of tartar separation.

Other objects and advantages of the present invention will become apparent from the description set forth below.

SUMMARY OF THE INVENTION

The present invention relates a technique for separating tartar from a source liquid of wine or grape juice which has been processed at a low temperature in ordinary way. The technique conducts the crystallization stage and the classification stage separately while those stages have been conducted in one and the same conventional DTB crystallizer described above. The crystallization stage is conducted in a crystallizer having a draft tube. In the crystallizer, tartar which is dissolved in a source liquid, is crystallized with seed crystals added to the source liquid. The seed crystals may be crystals which result from the crystallization of a source liquid and consist primarily of potassium hydrogentartrate. The treated source liquid which overflows from the upper portion of the crystallizer, is introduced into a hydrocyclone. A chemically stabilized product is obtained as the upward stream from the hydrocyclone. The downward stream from the hydrocyclone is returned to the crystallizer so as to utilize the crystallized tartar contained therein as seed crystals. Thus, the present invention can continuously separate tartar from a source liquid of wine or grape juice.

In one aspect, the present invention provides a method for continuously removing tartar from a source liquid of wine or grape juice by use of seed crystals. The method employs a DTB crystallizer which comprises a crystallizing vessel and a draft tube. The draft tube is placed in a center portion of the vessel so as to define an annular zone between the inner periphery of the crystallizing vessel and the outer periphery of the draft tube. The draft tube has a height of $\frac{1}{2}$ to $\frac{1}{4}$ the total height of the crystallizer. A downward or upward flow is produced inside the draft tube, and a upward or downward flow is produced in the annular zone. The flow in the annular zone is slower than the flow inside the draft tube. A source liquid of wine or grape juice is introduced from the bottom of the crystallizer into the crystallizer at a low temperature, and a suspension containing tartar crystals is added to the crystallizer as seed crystals. The source liquid is circulated with the downward flow and the upward flow along the draft tube with keeping the liquid at a low temperature to crystallize tartar dissolved in the source liquid. The circulation comprises a fast downward or upward flow inside the draft tube, a slow upward or downward flow between the inner periphery of said vessel and the outer periphery of said draft tube, a first reversal flow above the draft tube and a second reversal flow below the draft tube. The source liquid is overflown from an upper portion of the crystallizer, and the overflown liquid is introduced into a hydrocyclone. The upward stream output of the hydrocyclone is recovered to obtain a product from which tartar crystals are removed. The downward stream output of the hydrocyclone is returned to the crystallizer to be utilized as seed crystals.

At the end of operation, the source liquid which remains together with tartar crystals in the crystallizer, is discharged from the bottom of the crystallizer, and is introduced directly into the hydrocyclone. Then, the upward stream output of the hydrocyclone is recovered to the container for treated liquid as a product from which tartar crystals are removed. The downward stream output of the hydrocyclone is introduced into a mechanical separator, and then is separated into a clarified liquid and a suspension in which tartar crystals are contained at a high concentration. The clarified liquid is recovered to the container for treated liquid as a product. The suspension is stored so as to be served as seed crystals in subsequent operations.

In another aspect, the present invention provides an apparatus for removing tartar from a source liquid of wine or grape juice. The apparatus comprises a container for source liquid, a crystallizer, a hydrocyclone and a container for treated liquid.

The crystallizer comprises a crystallizing vessel, a draft tube, a stirrer and a cooling jacket. The draft tube is disposed in a center portion of the vessel so as to define an annular zone between the inner periphery of the crystallizing vessel and the outer periphery of said draft tube. The draft tube has a height of $\frac{1}{2}$ to $\frac{1}{4}$ the height of the vessel and has a cross section smaller than the annular zone. The stirrer is adapted to produce a circulation of liquid along the draft tube. The cooling jacket is disposed on the outer periphery of the vessel. The vessel has an inlet for source liquid at the bottom thereof, an outlet for treated liquid in the upper portion thereof and an inlet for tartar suspension in the lower portion thereof.

The hydrocyclone has an outlet for upward stream on the top portion thereof, an outlet for downward stream on the bottom portion thereof and an inlet on the upper portion thereof.

The container for source liquid is connected via a conduit with the inlet for source liquid of the crystallizer. The outlet for treated liquid of the crystallizer is connected via a conduit with the inlet of the hydrocyclone. The outlet for upward stream of the hydrocyclone is connected via a conduit with the container for treated liquid. The outlet for downward stream of the hydrocyclone is connected via a conduit with the inlet for tartar suspension of the crystallizer.

These conduits form a main line for continuous operation.

The inlet for tartar suspension of the crystallizer is also connected via an auxiliary conduit with a container which stores a tartar suspension so that the tartar suspension may be introduced as seed crystals from that container into the crystallizer at the beginning of operation.

The inlet for source liquid of the crystallizer is also connected via an auxiliary conduit with the inlet of the hydrocyclone so that the source liquid which remains together with tartar crystals after operation, may be introduced from the crystallizer directly into the hydrocyclone.

The outlet for downward stream of the hydrocyclone is also connected via an auxiliary conduit with a mechanical separator so that the downward stream may be separated into a clarified liquid and a suspension in which tartar crystals are contained at a high concentration. The mechanical separator has an auxiliary conduit which leads the clarified suspension into the container for treated liquid and a conduit which leads the suspension to the container for tartar suspension.

These auxiliary conduits may diverge via three-way valves from the main line.

DETAILED DESCRIPTION OF THE PRESENTLY PREFERRED EMBODIMENT

Figure 1:
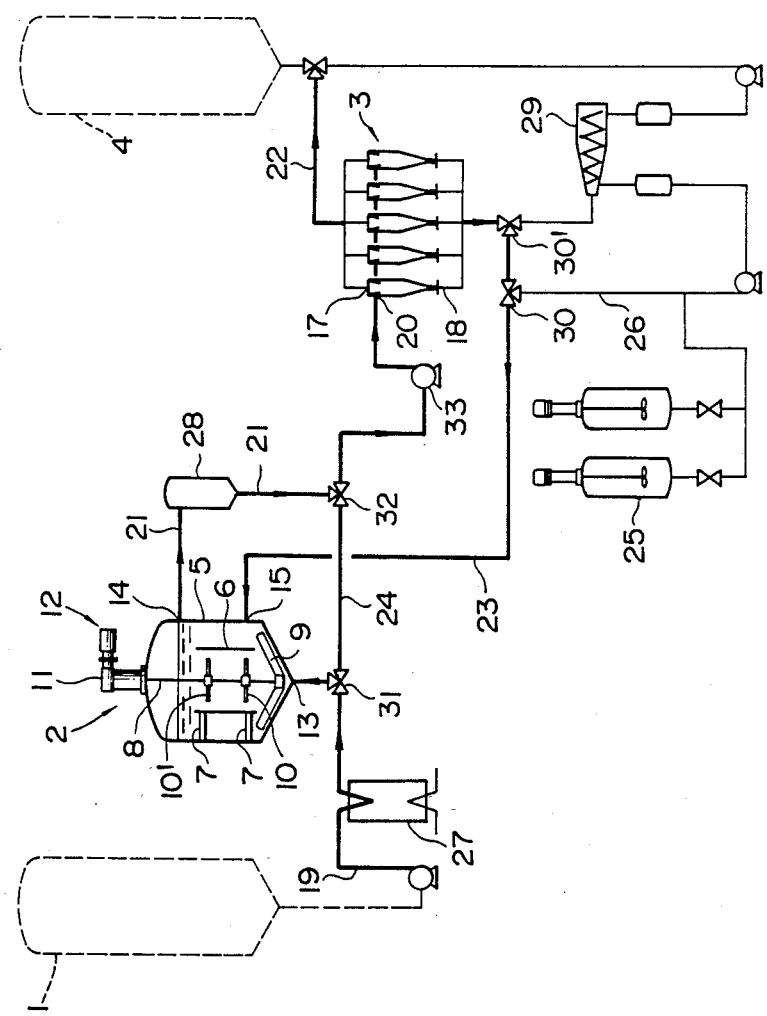
FIG. 1 is a flow sheet of a preferred embodiment of the apparatus according to the present invention.

In FIG. 1, an apparatus comprising a container for source liquid, a crystallizer, a hydrocyclone and a container for treated liquid, which are generally indicated by the numerals 1, 2, 3 and 4, respectively. The container 1, the crystallizer 2, the hydrocyclone 3, and the container 4 are connected in series by a main line. The main line comprises valves and conduits such as pipes made of stainless steel and hoses. The apparatus also comprises a separator and a container for seed crystal suspension, which are indicated by the numerals 29 and 25, respectively.

Figure 2:
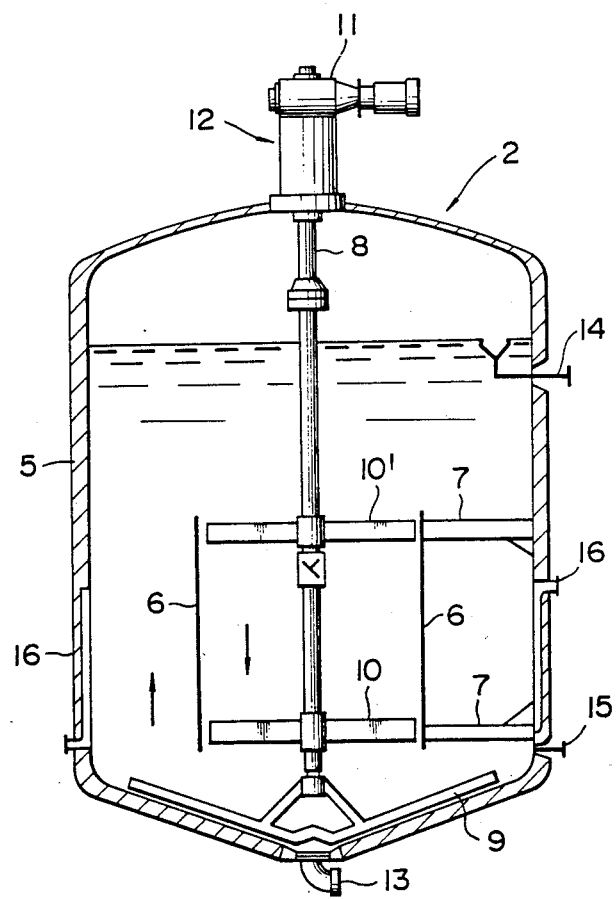
FIG. 2 is a diagrammatic illustration of the DTB crystallizer used in the embodiment of FIG. 1.
Figure 3:
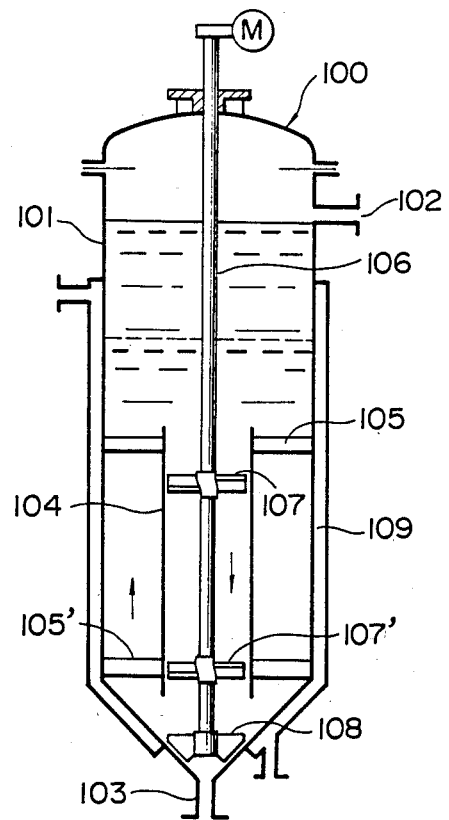
FIG. 3 is a diagrammatic illustration of a DTB crystallizer.

As best shown in FIG. 2, the crystallizer 2 comprises a crystallizing vessel and a draft tube 6. The crystallizing vessel comprises an upright cylindrical body 5 and a conical bottom. The body 5 is preferably made of stainless steel. The draft tube 6 is coaxially disposed in a center portion inside of the body 5. The draft tube 6 is supported by appropriate supporting members 7 which extend from the inner wall of the body 5 inwardly of the body 5. Preferably, the draft tube 6 has a height of $\frac{1}{2}$ to $\frac{1}{4}$ the height of the total height of the crystallizer 2 and has a diameter of $\frac{1}{2}$ to $\frac{1}{3}$ the diameter of the body 5. The crystallizer further comprises a stirrer which is generally indicated by the numeral 12. The stirrer 12 comprises a shaft 8 and propellers 9, 10 and 10'. The shaft 8 extends along the common axis of the body 5 and the draft tube 6 from the outside of the top portion to the vicinity of the conical bottom of the body 5. The propeller 9 is mounted on the bottom end of the shaft 8 so as to be located adjacent to the conical bottom of the crystallizer 2. The propeller 10 is mounted on the bottom portion of the shaft 8 surrounded by the draft tube 6. The propeller 10' is mounted on the top portion of the shaft 8 surrounded by the draft tube 6. If necessary, two or more of propellers may be provided inside of the draft tube 6. The stirrer 12 is rotated at an appropriate speed by driving the shaft 8 with a driving means such as a motor mounted on the top of the crystallizer 2.

In this embodiment, the propeller 9 is adapted to make liquid in the conical bottom of the body 5 flow upwardly through the annular zone defined between the inner periphery of the body 5 and the outer periphery of the draft tube 6 into the portion above the draft tube 6, and the propellers 10, 10' are adapted to make the liquid inside the draft tube 6 flow downwardly. Thus, a circulation comprising an upward flow through the annular zone, a downward flow through the inside of the draft tube 6, a first reversal flow below the draft tube 6 and a second reversal flow above the draft tube 6, is effected. However, the propellers 9, 10 and 10' may be adapted to effect the inverse circulation.

The crystallizer 2 has an inlet 13 for source liquid at the bottom of the body 5, an outlet 14 for treated liquid on the upper wall of the body 5 and an inlet 15 for tartar suspension on the lower wall of the body 5. The crystallizer 2 has a cooling portion 16 such as cooling jacket on its exterior wall. Insulation materials are also provided with the entire surface of the exterior wall Coolant is supplied to the cooling portion 16 to maintain liquid at a low temperature inside the crystallizer 2.

The hydrocyclone 3 is a multi-hydrocyclone which combines a plurality of hydrocyclones together so that the capacity may be varied depending on the amount of liquid to be treated. However, the hydrocyclone 3 may be replaced with any one of the hydrocyclones which have conventionally been used. The hydrocyclone 3 has an outlet 17 for upward stream at its top, an outlet 18 for downward stream at its bottom and an inlet 20 on its upper wall.

The container 1 stores a source liquid of wine or grape juice. The container 4 stores a product of wine or grape juice which has been chemically stabilized according to the present invention.

A conduit 19 connects the container 1 with the inlet 13 for source liquid of the crystallizer 2. A conduit 21 connects the outlet 14 for treated liquid of the crystallizer 2 with the inlet 20 of the hydrocyclone 3. A conduit 22 connects the outlet 17 for upward stream of the hydrocyclone 3 with the container 4. A conduit 23 connects the outlet 18 for downward stream of the hydrocyclone 3 with the inlet 15 for tartar suspension of the crystallizer 2. The conduits 19, 21, 22 and 23 are made of stainless steel.

A conduit 24 connects the conduit 19 and the conduit 21 at three-way valves 31 and 32, respectively. After operation, the valves 31 and 32 are changed so as to lead tartar suspension remaining in the crystallizer 2 to the hydrocyclone 3 via the conduit 24. A conduit 26 which is led from the container 25, connects the conduit 23 at a three-way valve 30. The container 25 stores a tartar suspension having a high concentration, which is recovered from the treated liquid and is supplied as seed crystals to the crystallizer 2 when operation is started.

At the beginning of operation, the valve 30 is changed so as to lead the suspension contained in the container 25 to the conduit 23 via the conduit 26 and to supply seed crystals to the crystallizer 2. The conduit 23 also connects a separator 29 via a three-way valve 30'. The separator 29 is a screw decanter. During continuous operation, the valve 30' leads the downward stream of the hydrocyclone 3 to the crystallizer 2 via the conduit 23. When the operation is over, the valve 30' is changed to lead the downward stream into the separator 29. The separator 29 separates the downward stream into a liquid which is free from tartar and a tartar suspension having a high concentration. The treated liquid is recovered to the container 4. The tartar suspension is recovered to the container 25.

In order to lead source liquid to the crystallizer 2 with keeping it at a low temperature, a cooling means 27 is provided on the conduit 19. A buffer tank 28 and a pump 33 are interposed in the conduit 21. The buffer tank 28 receives the treated liquid overflowing from the crystallizer 2 and regulates the amount of the liquid which is introduced via the pump 33 into the hydrocyclone 3.

Operation

With reference to FIGS. 1 and 2, the operation of the apparatus according to the present invention is now set forth.

A source liquid of wine or grape juice which tends to precipitate tartar between bottling and consumption, is stored in the container 1. The source liquid is conveyed through the conduit 19 to the inlet 13 of the crystallizer 2, while the source liquid is kept at a temperature of 0° to −3° C. by the cooling means 27. The source liquid which has been introduced into the crystallizer 2, is kept at a low temperature of 0° to −3° C. by virtue of the cooling portion 16 and the insulating material which covers the entire exterior wall of the crystallizer 2. At the same time when the source liquid is introduced into the crystallizer 2, tartar suspension is introduced from the container 25 as seed crystals through the conduits 26 and 23 to the inlet 15 of the crystallizer 2. Although the amount of the seed crystals to be added depends on properties and temperature of source liquid, it is preferably 7 to 8 grams per liter of source liquid when the source liquid has a temperature of about 0° C., and 3 to 4 grams per liter of source liquid when the source liquid has a temperature of about −3° C.

The stirrer 12 is started after source liquid has been charged to the level of the propeller 10. In other words, the propeller 10 and 10' located inside the draft tube and the propeller 9 located at the lower portion of the crystallizer 2 are rotated by the shaft 8 driven by the motor 11. Since the propeller 9 and the propellers 10, 10' are adapted to force the liquid to flow in opposite direction, the liquid flows downwardly inside the draft tube 6 and upwardly in the annular zone defined between the draft tube 6 and the body 5 of the crystallizer, as shown in arrows in FIG. 2. Since the draft tube 6 has a diameter of ½ to ⅓ the diameter of the body 5 and thus the cross sectional area of the annular zone is designed to be larger than that of the draft tube 6, the liquid flows upwardly in the annular zone at a linear velocity slower than inside the draft tube. During the upward and downward flows, secondary nucleation is induced by the seed crystals, and nuclei of tartar crystals occur particularly in the draft tube. Since tartar crystals which have grown are prevented by the propeller 9 from precipitating and accumulating on the conical bottom of the crystallizer 2, they are entrained by the upward flow and circulated to the upper portion of the crystallizer so that crystallization is uniformly effected in the crystallizer.

In this way, the source liquid which has been introduced into the bottom of the crystallizer, is treated to reduce the concentration of tartar dissolved therein. After residing and circulating in the crystallizer 2, the treated liquid is overflown from the outlet 14 located on the upper wall of the crystallizer 2 and supplied via the conduit 21 to the inlet 20 of the hydrocyclone 3. If the treated liquid overflowing from the crystallizer 2 is supplied directly to the hydrocyclone 3 via a pump 33, it is preferred that the liquid is supplied by way of a buffer tank 28 to the pump 33 so that variation of the amount of the treated liquid is moderated.

The treated liquid overflowing from the crystallizer contains tartar which has been crystallized in the crystallizer 2. The treated liquid is separated by the hydrocyclone 3 into tartar crystals and product liquid by virtue of its centrifugal function. The product liquid is discharged through the outlet 17 for upward stream, and then is conveyed via the conduit 22 to the container 4. The product liquid is chemically stabilized so as not to occur precipitates between bottling and consumption and thus maintains high commercial value.

On the other hand, a suspension in which a large amount of tartar crystals are contained, is discharged from the outlet 18 for downward stream to the outside of the hydrocyclone 3. The suspension is conveyed via the conduit 23 and is continuously introduced through the inlet 15 into the crystallizer 2 so that tartar crystals contained in the suspension are recycled to be used as seed crystals and to prevent the concentration of seed crystals in the crystallizer 2 from decreasing.

It is apparent from the above description that the present invention makes it possible to continuously process the source liquid stored in the container for source liquid and obtain the product in which tartar dissolved is reduced or eliminated, and further makes it possible to recycle seed crystals only if they are added from the outside at the beginning of operation so as to make it unnecessary to add seed crystals from the outside during operation.

When operation is finished, the three-way valves 31 and 32 are changed to connect the inlet 13 of the crystallizer 2 with the inlet 19 of the hydrocyclone 3 via the conduit 24. Also, the three-way valves 30 and 30' are respectively changed to close the conduit 23 which connects the outlet 18 for downward stream of the hydrocyclone 3 with the inlet 15 for tartar suspension of the crystallizer 2 and to connect the outlet 18 for downward stream with the separator 29. Then, the liquid which remains with tartar suspending in the crystallizer 2 after treatment has been finished, is led to the inlet 17 of the hydrocyclone 3. The liquid which has been introduced into the hydrocyclone 3, is separated by virtue of centrifugal function into a suspension in which a large amount of tartar crystals is contained and a liquid from which tartar crystals have been removed. The latter is discharged from the outlet 17 for upward stream and collected in the container 4. The former is discharged from the outlet 18 for downward stream and introduced into the separator 29. Then, the former is further separated by the separator 29 into a liquid from which tartar crystals have been removed and a suspension in which tartar is contained at a high concentration. That liquid is recovered by the container 4. That suspension is recovered by the container 25.

EXAMPLE

An experiment was conducted using the apparatus as shown in FIG. 1.

One hundred kiloliters of source liquid of wine was charged into a container 1 for source liquid having a volume of 100 kiloliters. The outlet located on the bottom of the container 1 was opened to supply the source liquid at a rate of 20 kiloliters per hour to a crystallizer 2 via a conduit 19 and an inlet 13 for source liquid In the way to the crystallizer 2, the source liquid was cooled to −3° C. by a plate-type cooler 27 which was located on the conduit 19.

The body 5 of the crystallizer 2 was made of stainless steel and had a volume of 20 kiloliters. The draft tube 6 was made of stainless steel and had a height of 150 cm and a diameter of 150 cm. The draft tube 6 was located in the center portion of the crystallizer by supporting it with supporting members 7. The propellers 10 and 10' were mounted on a shaft 8 inside the draft tube adjacent the bottom end of the draft tube and adjacent the top end of the draft tube, respectively. The propeller 9 was mounted on the shaft 8 so as to be arranged adjacent the bottom of the crystallizer 2. To the cooling jacket 16 which comprises insulating materials covering the entire exterior wall of the crystallizer 2, coolant was supplied to maintain the source liquid at −3° C. in the crystallizer 2.

After the source liquid had been supplied with the crystallizer 2 to the level of the propeller 10, 60 kilograms of tartar crystals were supplied to the crystallizer 2 by changing the valve 30 to connect the conduit 26 with the inlet 15 of the crystallizer 1 and to introduce from the container 25 into the crystallizer 2 a seed crystal suspension containing tartar crystals which had resulted from a source liquid and consisted of pottasium hydrogen-tartrate. After the suspension had been supplied, the valve 30 was closed.

Then, the motor 11 mounted on the top of the crystallizer 2 was started to rotate the propellers 9, 10 and 10' at 100 rpm or less. The propellers 10 and 10' produced a downward flow of the source liquid inside the draft tube 6 as shown by a downward arrow in FIG. 2. The propeller 9 produced a slow upward flow having a linear speed of 0.6 meter/hour of the source liquid in the annular zone defined between the inner periphery of the body 5 and the outer periphery of the draft tube 6 as shown by an upward arrow in FIG. 2. Thus, a circulation of the source liquid along the draft tube 6 was produced, in which crystallization of tartar was promoted by virtue of secondary nucleation induced by seed crystals and crystal growth of seed crystals.

While the source liquid was introduced into the crystallizer 2 at a rate of 20 kiloliters per hour for one hour, supernatant source liquid was overflown from the outlet 14. The overflown liquid was recovered to the buffer tank 28 and then introduced through the inlet 20 into the a multi-hydrocyclone 3 by way of the conduit 21 and the pump 33. The multi-hydrocyclone 3 was the one in which five standard hydrocyclones were put together. The multi-hydrocyclone 3 was operated to separate the overflown liquid from tartar crystals suspended therein. Wine from which tartar crystals had been removed, was discharged from the outlet 17 for upward stream and then recovered through the conduit 22 to the container 4.

Wine in which a large amount of tartar was contained, was discharged from the outlet 18 for downward stream and returned to the crystallizer 2 by way of the conduit 23 and the inlet 15 to keep the concentration of tartar at 3 grams/liter or more in the crystallizer 2.

Until the container 1 became empty, the above operation was continuously conducted for about 5 hours to produce 80 kiloliters of treated wine in the container 4.

After the above stage, the valve 31 was changed so that the inlet 13 for source liquid is disconnected with the conduit 19 and is connected with the conduit 24. Also, the valve 32 is changed to connect the conduit 24 with the inlet 20 of the multi-hydrocyclone. Also, the valve 30 was closed, and the valve 30' was changed to lead the downward stream from the multi-hydrocyclone 3 to a screw decanter 29. Then, the pump 33 was started to discharge the liquid which remained with tartar crystals suspending in the crystallizer 2 from the inlet 13 and introduce the same liquid into the inlet 20 of the multihydrocyclone 3 via the conduit 24. The multi-hydrocyclone 3 was operated to separate the liquid into an upward stream of wine from which tartar crystals were removed and a downward stream of wine in which a large amount of tartar crystals was contained.

The upward stream of wine from which tartar crystals were removed, was conveyed from the outlet 17 of the multi-hydrocyclone 3 via the conduit 22 to the container 4 for treated liquid.

The downward stream of wine in which tartar was contained, was further separated by the screw decanter 29 into a wine from which tartar crystals were removed and a wine in which tartar crystals were contained at a high concentration. The former was conveyed to the container 4 for treated liquid via conduit. The latter was conveyed to the container 25 for tartar suspension via conduit.

The above stages were completed in six hours, and 100 kiloliters of wine from which tartar dissolved was reduced, was obtained.

The above description deals with a crystallizer having a single draft tube. Alternatively, a crystallizer may have a plurarity of narrow draft tubes which are placed end to end at intervals and/or side by side so that the crystallizer processes even a small amount of liquid.

Caveat

Obviously, numerous modifications and variations of the present invention are possible in light of the above teachings. It is therefore to be understood that, within the scope of the appended claims, the invention may be practiced otherwise than as specifically described herein.

We claim:

1. A method for continuously removing tartar from wine or grape juice by use of seed crystals, said method comprising the steps of:
    (a) placing a draft tube in a center portion of a crystallizer so as to define an annular zone between the inner periphery of the crystallizer and the outer periphery of the draft tube, said draft tube having a height of $\frac{1}{2}$ to $\frac{1}{4}$ the total height of the crystallizer;
    (b) producing a downward or upward flow inside the draft tube and an upward or downward flow in the annular zone, said flow in the annular zone being slower than said flow inside the draft tube;
    (c) introducing a source liquid of wine or grape juice from the bottom of the crystallizer into the crystallizer at a low temperature and adding a suspension containing tartar crystals to the crystallizer as seed crystals;

(d) circulating the source liquid with the downward flow and the upward flow along the draft tube with keeping the liquid at a low temperature, to crystallize tartar dissolved in the source liquid;

(e) overflowing the source liquid from an upper portion of the crystallizer and introducing the overflown liquid into a hydrocyclone;

(f) recovering an upward stream output of the hydrocyclone to obtain a product from which tartar crystals are removed; and (g) returning an downward stream output of the hydrocyclone to the crystallizer.

2. A method according to claim 1 in which further comprises the step of discharging source liquid through the bottom of the crystallizer and introducing the liquid into the hydrocyclone when necessary.

3. A method according to claim 1 which further comprises the step of separating the downward stream output of the hydrocyclone by a separator into a product and a suspension in which tartar crystals are contained at a high concentration when necessary.

* * * * *